United States Patent
Ervin et al.

(10) Patent No.: US 7,342,877 B1
(45) Date of Patent: Mar. 11, 2008

(54) METHOD AND SYSTEM FOR PROVIDING A LOOP-FREE RING TOPOLOGY

(75) Inventors: Jimmy Ervin, Raleigh, NC (US); Praveen Bhagwatula, Rohnert Park, CA (US); Russell Gardo, Raleigh, NC (US); Charles Allen Carriker, Cary, NC (US); Thomas E. Black, Jr., Santa Rose, CA (US); Steven Faulkner, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 932 days.

(21) Appl. No.: 10/436,663

(22) Filed: May 13, 2003

(51) Int. Cl.
*G06F 11/00* (2006.01)

(52) U.S. Cl. .................. 370/225; 370/217; 370/224; 709/223

(58) Field of Classification Search ............... 370/379, 370/395.72, 405, 426
See application file for complete search history.

(56) References Cited

U.S. PATENT DOCUMENTS

| | | | |
|---|---|---|---|
| 4,837,856 A * | 6/1989 | Glista, Jr. ...................... 398/6 |
| 5,761,435 A | 6/1998 | Fukuda et al. ......... 395/200.68 |
| 5,859,959 A | 1/1999 | Kimball et al. ........ 395/182.02 |
| 6,304,575 B1 | 10/2001 | Carroll et al. .............. 370/408 |
| 7,065,040 B2 * | 6/2006 | Nagamine ................... 370/223 |
| 2001/0048687 A1* | 12/2001 | Coden ......................... 370/403 |
| 2004/0103179 A1* | 5/2004 | Damm et al. ............... 709/223 |

* cited by examiner

*Primary Examiner*—Daniel J. Ryman
*Assistant Examiner*—Salvador E. Rivas
(74) *Attorney, Agent, or Firm*—Cindy Kaplan

(57) ABSTRACT

A method for preventing loops in a ring topology of a computer network is disclosed. The method includes receiving a packet at a node on a shared packet ring and inserting a header containing an ID identifying the node at which the packet was received on the ring as an originating node. The packet is forwarded onto the ring and the ID is checked when received on a node. The packet is dropped if the ID identifies the node as the originating node.

20 Claims, 6 Drawing Sheets

METHOD AND SYSTEM FOR PROVIDING A LOOP-FREE RING TOPOLOGY

BACKGROUND OF THE INVENTION

The present invention relates generally to communication networks, and more specifically, to a scalable, loop-free ring topology, which does not require control plane messaging, and associated protocols.

Spanning-Tree Protocol (STP) is a Layer 2 protocol designed to run on bridges and switches. The STP specification is defined in IEEE 802.1d. The main goal of STP is to make sure that a loop situation does not occur when there are redundant paths in a network. STP accomplishes this by disabling network loops and providing backup links between switches or bridges. STP allows devices to interact with other STP compliant devices in the network to ensure that only one path exists between any two stations on the network. If STP or a similar protocol is not present in a redundant topology network, switches may endlessly flood broadcast packets to all ports (i.e., broadcast storm). When multiple copies of a frame arrive at different ports of a switch, MAC entry instability in a Filtering Database may occur.

STP, RSTP (Rapid Spanning Tree Protocol) (defined in IEEE 802.1W), and other topology distribution protocols have partially solved the loop problems described above. However, these solutions are not scalable when sub-second convergence times are required. Furthermore, these protocols do not utilize bandwidth well (i.e., one link/port is always blocked) and are often very complex and result in additional hardware requirements.

There is, therefore, a need for a scalable, loop-free, ring topology which optimizes available bandwidth utilization without the overhead complexity of control packets and associated protocols.

SUMMARY OF THE INVENTION

A method for preventing loops in a ring topology of a computer network is disclosed. The method includes receiving a packet at a node on a shared packet ring and inserting a header containing an ID identifying the node at which the packet was received on the ring as an originating node. The packet is forwarded onto the ring and the ID is checked when received on a node. The packet is dropped if the ID identifies the node as the originating node.

In one embodiment, the method further includes receiving notification of a link failure at a node connected to the failed link and entering a wrapping state at the node. When the packet is received at the node in wrapping state and a wrap flag is not already set, the wrap flag is set and the packet is forwarded back onto the ring. If the wrap flag is set when received at the node in wrapping state, the packet is processed and is removed from the ring.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. The network may be a packet based optical network that uses Ethernet data layer at speeds of 10 Gb/s (or above or below 10 Gb/s), both over high speed point-to-point circuits (i.e., dark fiber) and over WDM. However, it is to be understood that the system may be used with media types different than those described herein, without departing from the scope of the invention. A network element may be, for example, a terminal multiplexer, an add-drop multiplexer (ADM), an optical crossconnect (OXC), a signal regenerator, router, switch, or other optical node interface.

A system and method of the present invention provide a scalable, loop-free ring topology which optimizes available bandwidth utilization without the overhead and complexity of control packets and associated protocols. In one embodiment, the system is a network layer-2 (bridging) system that may be used, for example, to replace a single packet ring topology where a protocol such as STP is used to provide loop-free packet forwarding delivery. The system may also be used for other applications (e.g., layer-3), without departing from the scope of the invention.

Figure 1:
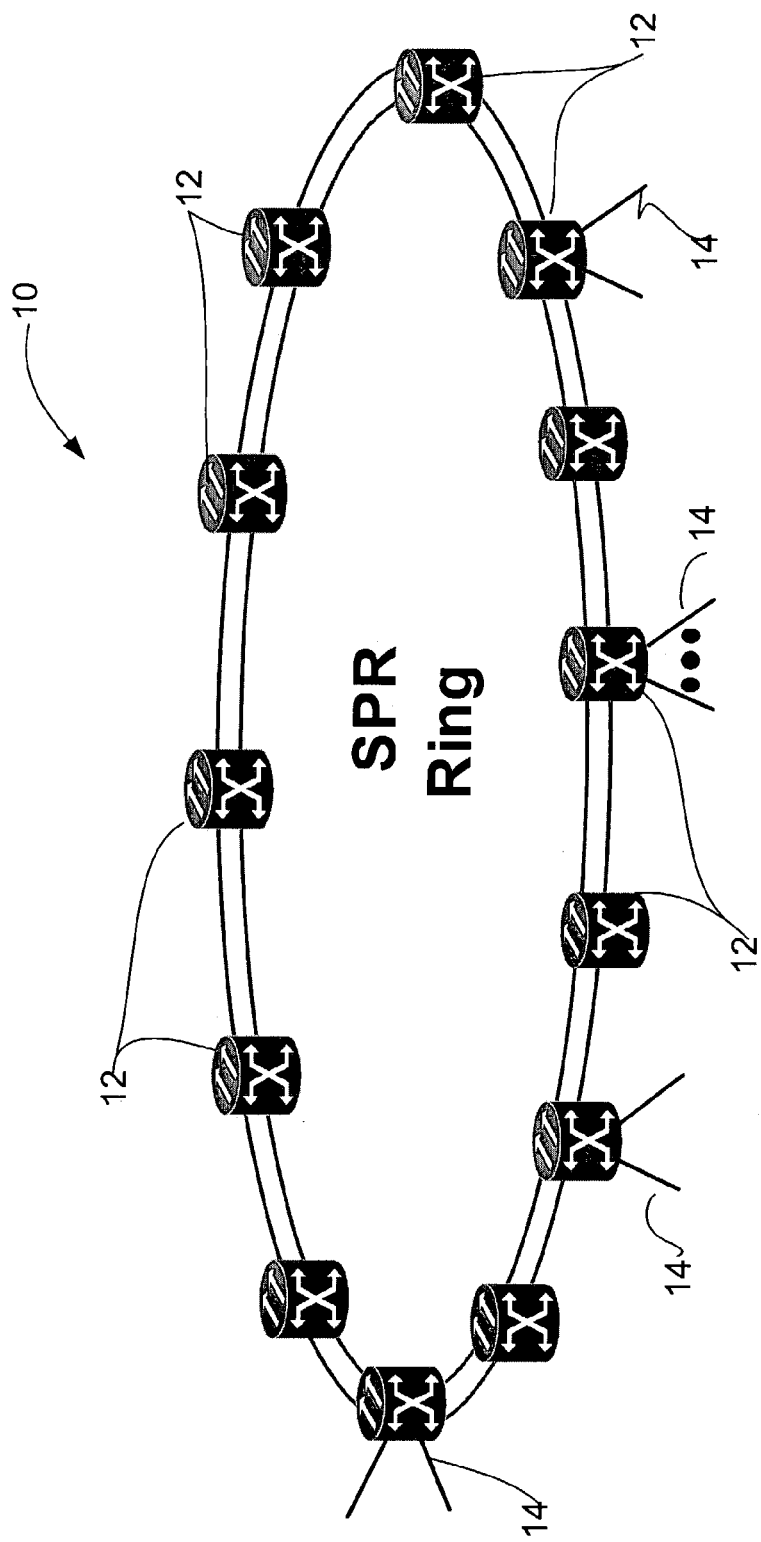
FIG. 1 is a diagram illustrating an exemplary shared packet ring.

FIG. 1 illustrates an exemplary shared packet ring 10. The ring is made up of two or more nodes 12 (thirteen shown) attached with point-to-point connections to form a circle. The primary path is shown connecting adjacent nodes. Each node has two connections, one to each adjacent node on the ring. A node is defined herein as an attachment point on the ring where packets are added, removed, passed, or forwarded. A node may be, for example, a network bridge, router, or other such device. A single connection between two nodes where the state of connection is known is a point-to-point connection. When packets can be forwarded in both directions across the connection, it is referred to as connected; otherwise, it is referred to as not connected (e.g., broken link or outage).

As described in detail below, loops are prevented through a process whereby the originating node drops the packet. Additional loop prevention mechanisms are also described below. Packet loss is prevented when an outage (e.g., fiber-cut) occurs by a wrap mechanism operating at the node detecting an outage. Pass-thru traffic is optimized by including a destination node identifier in the packet. Also, a simple hash mechanism is used for determining the add traffic direction. The following description is provided from a network layer-2 bridging standpoint.

Figure 2:
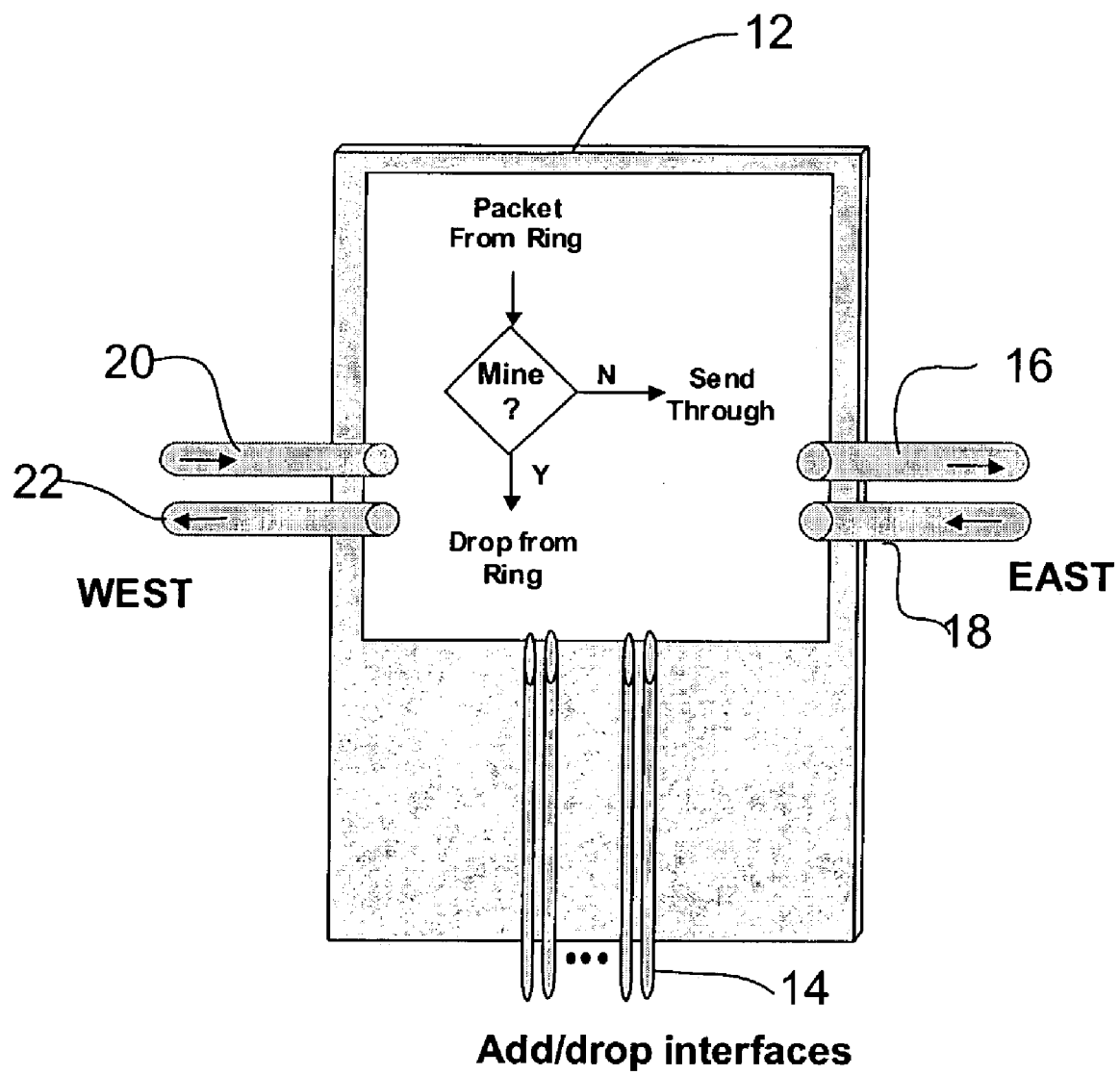
FIG. 2 is a diagram illustrating details of one of the devices of the shared packet ring of FIG. 1.

FIG. 2 illustrates additional detail of the nodes of the ring of FIG. 1. Each node includes an east egress port 16, east ingress port 18, west ingress port 20, and west egress port 22. At least some of the nodes of the ring also include add/drop interfaces 14.

A packet received at a node in the ring is modified by adding the following information to the packet:
Destination Node (DN)
Source Node (SN)
Destination ID and Source ID
Priority
Flags
Time To Live (TTL)

In one embodiment, the above information is included in an eight-byte header referred to as a Ring-Header. The information is then stripped from the packet when the packet is removed from the ring. The above header information is provided as one example of a format that may be used for the present invention. It is to be understood that other formats may be used including less information or more information, without departing from the scope of the invention.

The Destination Node is an 8-bit field having, for example, one of the following values:
0xff for Multicast DA-MAC
0x00 for Unknown DA-MAC The Source Node is also an 8-bit field. The DN and SN fields contain a unique identifier used to select a single node attached to the ring. The Destination and Source ID field has local meaning (e.g., front-side port ID). The priority field identifies the QoS class of service.

The flag options include:
B: Bypass flag
W: Wrap flag
DE: Discard Eligible

The TTL field is an optional field that may be included in the header to prevent loops in error situations.

The DN field and bypass flag are used to make an optimized pass-thru decision. When either of the following two conditions is true, the packet is forwarded around the ring as pass-thru traffic without performing the typical forwarding lookups (e.g., bridging table DA-MAC or SA-MAC lookups):

1) The bypass flag is set in the received packet; or
2) The DN does not match the node's ID or one of the DN values.

When either of the above conditions exists, the packet is considered a pass-thru packet.

If QoS has been configured on one of the ports (e.g., Packet Over SONET (POS) port), the typical QoS code is executed on pass-thru packets. However, it is not necessary to perform all other lookups (e.g., ACL lookups, Interface MAC lookups (intf+DA), DA-MAC, SA-MAC, and all layer-3 lookups). The pass-thru ability also reduces or eliminates the need for configuration at each node. For example, in a STP controlled ring, each node must have at least one instance of STP configured and running in the node. With the present system, however, this is not required.

Also, when packets are forwarded, if the packet does not apply to the node, it is forwarded around the ring.

Figure 3:
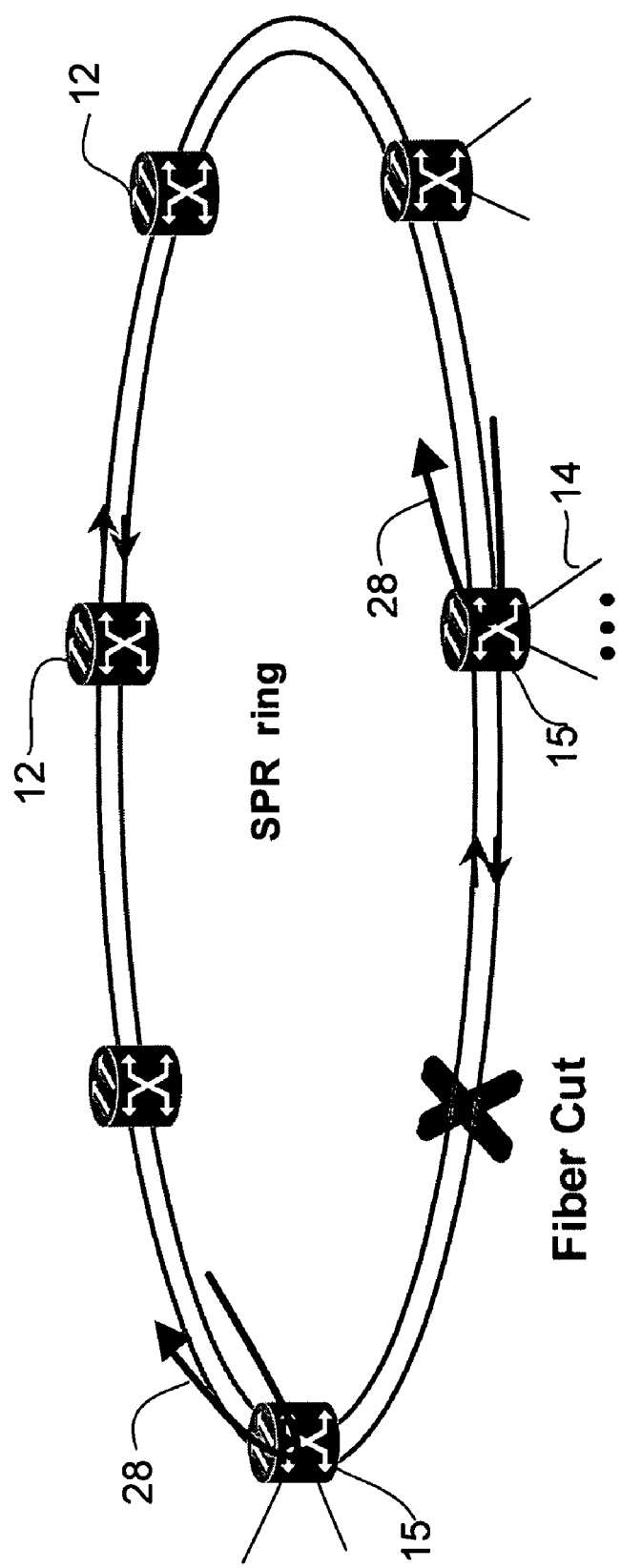
FIG. 3 is a diagram illustrating shared packet ring protection on the ring of FIG. 1.
Figure 4:
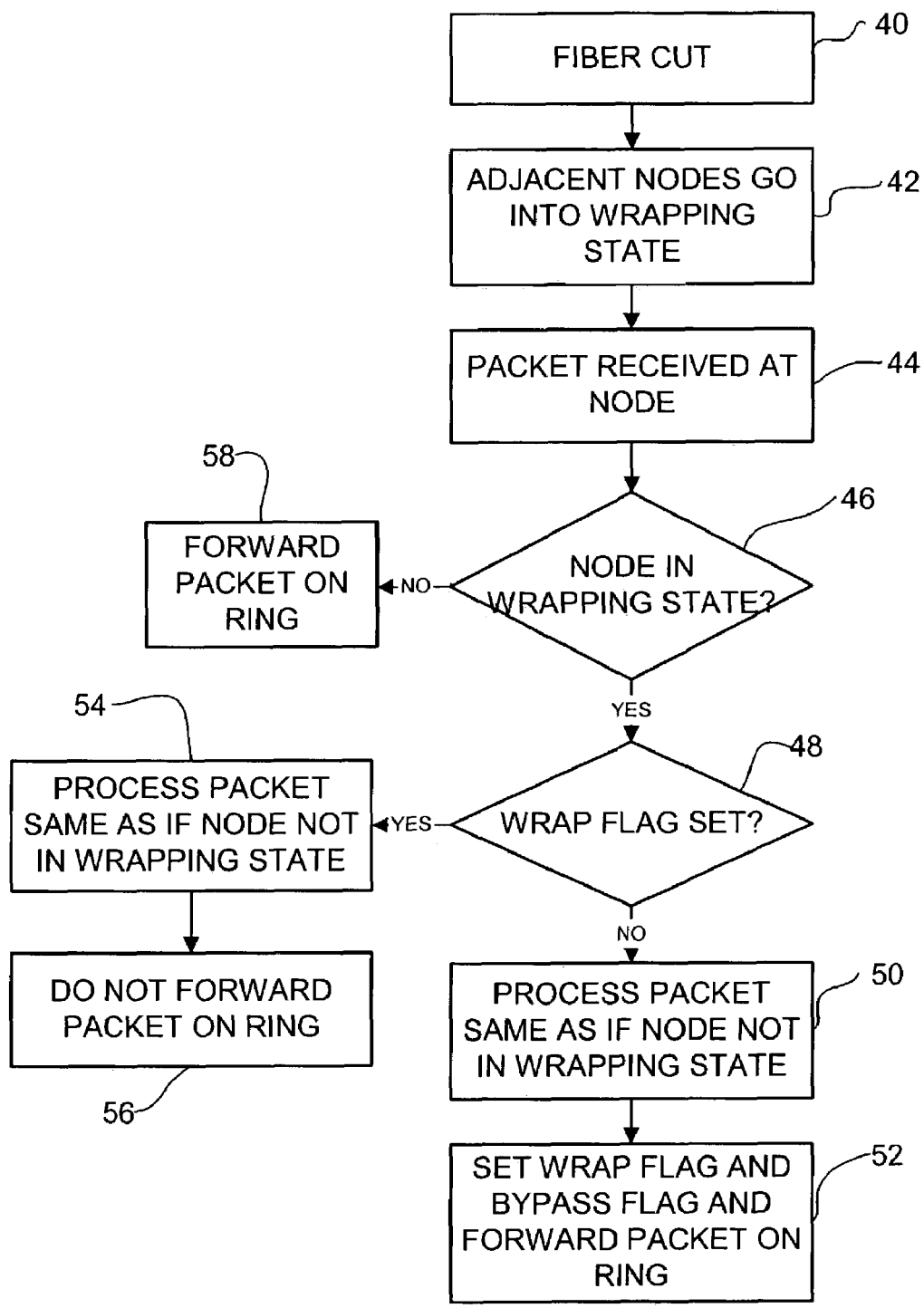
FIG. 4 is a flowchart illustrating a process for wrapping packets at a failure point in the ring of FIG. 3.

FIG. 3 shows a fiber cut between two nodes 15 of a shared packet ring and FIG. 4 is a flowchart illustrating a process for wrapping packets at the failure point in the ring. When a link goes down, each node 15 connected to that link goes into a wrapping state, as shown by arrows 28 in FIG. 3 (steps 40 and 42 of FIG. 4). Packet wrapping is a scheme that calls for packets to simply turn around and go the other way around the ring when they hit a disconnection. When a packet is received by a node in the wrapping state and the wrap flag is not set in the packet, the node 15 processes the packet the same as if not in wrapping state (steps 44, 46, 48, and 50). If the node 15 would have normally forwarded the packet out from the connection that is down, it forwards the packet back onto the ring in the opposite direction. The node 15 sets the wrap and bypass flags in the packet, before sending it back onto the ring (step 52). When a node that is in the wrapping state receives a packet with the wrap flag set, the node 15 processes the packet the same as if it were not in wrapping state, except that the node does not forward the packet back onto the ring (steps 46, 48, 54, and 56). If the packet is received at a node which is not in wrapping state, the node forwards the packet on the ring (steps 46 and 58).

Figure 5:
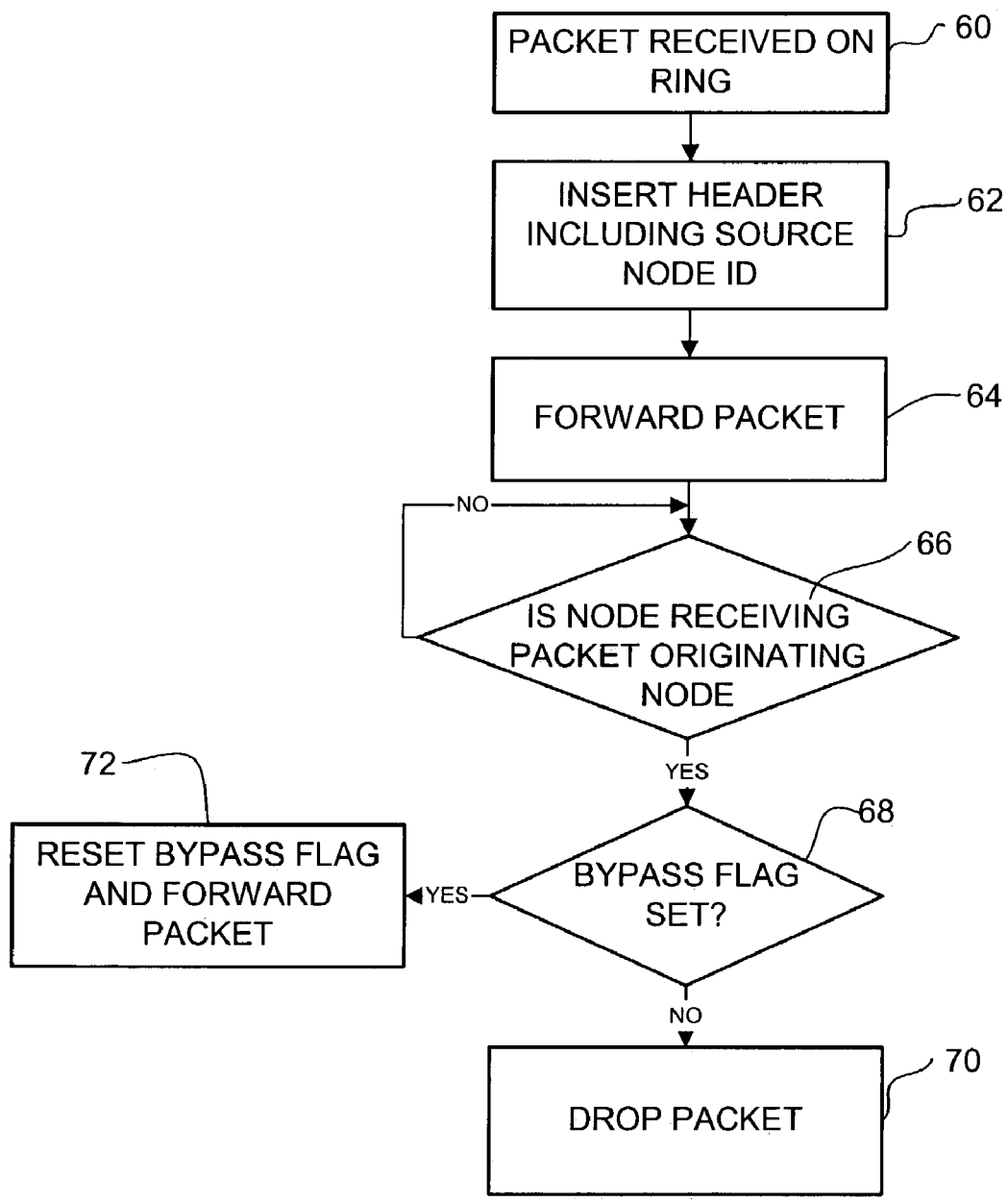
FIG. 5 is a flowchart illustrating a process for dropping packets at an originating node to prevent loops.

FIG. 5 is a flowchart illustrating how source node and bypass flags are used. When the eight-byte header is first added to a packet (e.g., packet was received over an Ethernet port), the source node ID is added using that node's ID (steps 60 and 62). The packet is forwarded at step 64. When the originating node receives the same packet that it put onto the ring (i.e., SN is same as the node's ID), if the bypass flag is not set, the packet is dropped since all nodes around the ring have processed the packet (steps 66, 68, and 70). If the bypass flag is set, the bypass flag is reset and the packet is forwarded on the ring (steps 68 and 72).

When a database lookup is performed on a packet from the ring, a layer-2 learn is performed on the source MAC. When this occurs, the source node ID is saved in the same entry that is learned through normal bridging and saved in the bridging table entry. All pass-thru packets have their SN checked. When the originating node receives a packet that it has to drop, if the DN is not 0xff or 0x00, the originating node invalidates the CAM entry found using the DA-MAC.

When a bridging table lookup is performed on a packet received from the ring, it is not forwarded around the ring if the DA-MAC is found in the bridging table. Thus, packets with a DN=0x00 are not forwarded around the ring when a match is found in that node's bridging table. For add traffic, the destination node is set in the packet from the data in the bridging table entry found for that DA-MAC address. When a matching bridging table entry is not found for a unicast packet and the DN in the packet matches the node's IDs, the packet is flooded without modification. The packet therefore continues around the ring. When a bridging table entry is found doing a MAC-DA lookup, if the DN in the packet does not match the DN in the CAM entry, neither the CAM entry nor the packet is modified. Therefore, there is no reason to compare the DN stored in the CAM entry to the DN in the packet when performing a MAC-DA lookup.

For add traffic, the destination node is set in the packet using information saved in the bridging table for that destination MAC address. If this information is not available, or the packet is a multicast packet, the DN field is set to 0x00 or 0xff, respectively. A different value is used for multicast DA-MACs to allow the node to bypass checking the DA-MAC.

The Priority field and the DE bit in the Ring-Header may be used to provide differential service to the traffic as it traverses around the ring. The node that adds the traffic to the ring can set the DE bit and the QoS priority bits to a certain value as a result of its packet classification policies and associated SLA (Service Level Agreement). The priority bits are Differentiated Services (DffServ) classes of service.

The following describes various optimization methods that may be used with the above described system.

A redirection mechanism may be provided as an optimization, but is not required for the present system to operate. Redirection occurs when a node wraps a packet rather than allowing it to continue in a sub-optimal direction. This occurs when both of the node's connections are connected/active. The present system is preferably configured to only redirect at the add node to minimize the accesses that must be made to memory to access a new Node ID table. The Node ID table is a table indexed by Node ID. The content of each entry contains an interface number or direction identifier (e.g., east or west around the ring) indicating the direction. The new Node ID table is only updated when the node receives a packet with a DN not matching one of the node IDs and the bypass flag is set in the received packet. This table is only read by the node when packets are being added to the ring.

The entries in the Node ID table are preferably kept up to date so that a hash mechanism is not over ridden when the fiber cut is restored. When the fiber cut is restored, one or both nodes on the ring send a reliable packet that clears the Node Id table in each node. The table is preferably cleared only when a fiber restore or similar or similar notification is received, to minimize the possibility of receiving packets which are out of order.

The following describes a DN field support for layer-3 routed packets. The mechanism is an optimization and not required by the above described system. The DN is set to 0 for packets added to the ring when those packets are forwarded by layer-3 onto the ring via a directly connected layer-3 interface. Thus, a pass-thru operation does not occur on these packets when the bypass flag is not set. A new IP ARP learning mechanism is added to save the node ID in the adjacency entry for the layer-3 interface. This mechanism is only used when the node that is being ARP'd is the one that responds, because the SN value in the ARP response packet is assumed to be the appropriate Node ID.

The Destination ID and Source ID fields in the Ring-Header may be used to further optimize data flow on drop-nodes. For example, the drop nodes may use this information to save the outgoing port number. When this is done, the drop-node (or egress node) can eliminate its DA-MAC lookup. In order to further optimize the egress node for drop traffic, instead of only storing the outgoing port number in this field, a vector can be stored in the Destination ID. The vector can then refer to the outgoing encapsulation, software entry point, and outgoing port number.

Figure 6:
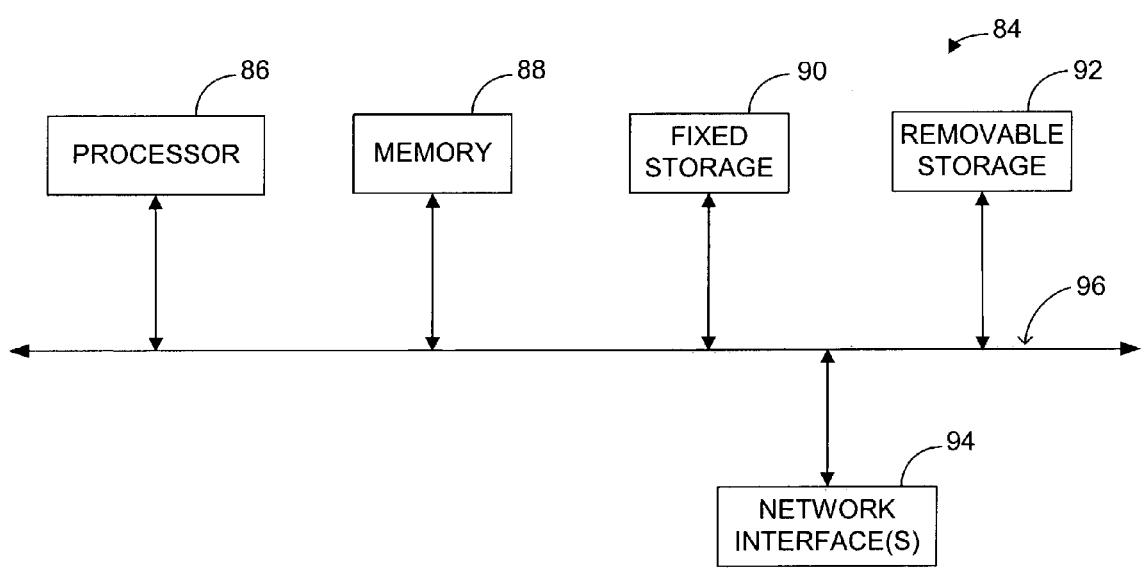
FIG. 6 is a system block diagram of a computer system that can be utilized to execute software of an embodiment of the present invention.

The invention described herein may be implemented in dedicated hardware, microcode, software, or photonic (optical) logic. FIG. 6 shows a system block diagram of computer system 84 that may be used as a router or host or used to execute software of an embodiment of the invention. The computer system 84 includes memory 88 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave (e.g., in a network including the Internet) may be the computer readable storage medium. Computer system 84 further includes subsystems such as a central processor 86, fixed storage 90 (e.g., hard drive), removable storage 92 (e.g., CD-ROM drive), and one or more network interfaces 94. Other computer systems suitable for use with the invention may include additional or fewer subsystems. For example, computer system 84 may include more than one processor 86 (i.e., a multi-processor system) or a cache memory.

The system bus architecture of computer system 84 is represented by arrows 96 in FIG. 6. However, these arrows are only illustrative of one possible interconnection scheme serving to link the subsystems. For example, a local bus may be utilized to connect the central processor 86 to the system memory 88. Computer system 84 shown in FIG. 6 is only one example of a computer system suitable for use with the invention. Other computer architectures having different configurations of subsystems may also be utilized. Communication between computers within the network is made possible with the use of communication protocols, which govern how computers exchange information over a network.

As can be observed from the foregoing, the system described herein provides numerous advantages. For example, the system does not require any ring topology information to be exchanged between nodes using non-data packets (e.g., control packets). The system provides improved bandwidth utilization and more scalable convergence as compared to an STP controlled ring topology. A layer-2 fail-over mechanism with sub-second convergence is provided for link cuts, restores, node failures, and inserting new nodes (e.g., bridges). The system may be implemented on most existing hardware (e.g., legacy) with only a software change. Since all VLANs on the ring do not need to be configured at all nodes, less VLAN configuration is required than typical STP controlled rings.

Furthermore, when the ring topology changes, bridging table entries (and similar tables) do not have to be updated to provide connectivity. Therefore, convergence times are much better using the present system because table updates are not included in the convergence time. Also, when the ring topology changes, only the two nodes directly connected to the topology change have to table corrective action. In STP/RSTP controlled rings, each node in the ring must receive a control packet and take the appropriate actions. Therefore, convergence times are much better using the present system because the convergence time does not involve the time it takes to send and receive control/protocol packets among the several nodes.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for preventing loops in a ring topology of a computer network, the method comprising:
    receiving a first packet at an add/drop interface at a node on a shared packet ring;
    inserting a header containing an ID identifying the node at which the packet was received on the ring as an originating node;
    forwarding the packet onto the ring;

receiving a second packet at the node and checking said ID and a bypass flag;

if the node is not in a wrapping state, dropping said second packet if said ID identifies the node as the originating node and said bypass flag is not set, and forwarding said second packet on the ring if said ID does not identify the node as the originating node or said bypass flag is set; and if the node is in said wrapping state, forwarding said second packet on the ring only if a wrap flag in said second packet is not set.

2. The method of claim 1 further comprising setting said bypass flag in said second packet if the node is in said wrapping state and said wrap flag is not set.

3. The method of claim 1 wherein inserting a header further comprises inserting a destination node ID.

4. The method of claim 3 wherein the destination node ID is set based on data in a bridging table entry.

5. The method of claim 4 further comprising flooding said second packet if the destination node ID matches the node's ID and a matching bridging table entry is not found.

6. The method of claim 1 further comprising:

receiving notification of a link failure at a node connected to the failed link; and entering said wrapping state at the node.

7. The method of claim 1 further comprising inserting a QoS priority bit into said header.

8. The method of claim 7 wherein the QoS priority bit identifies a Differentiated Services class.

9. The method of claim 1 further comprising redirecting the packet at the originating node if said bypass flag is set in the packet.

10. The method of claim 9 further comprising reading a node ID table containing an interface direction identifier for the originating node.

11. The method of claim 1 further comprising updating a node ID table if said second packet comprises a destination node ID not matching a node ID in the table and said bypass flag set.

12. A computer-readable storage medium encoded with computer program instructions for preventing loops in a ring topology of a computer network, the instructions comprising:

receiving a first packet at an add/drop interface at a node on a shared packet ring;

inserting a header containing an ID identifying the node at which the packet was received on the ring as an originating node;

forwarding the packet onto the ring;

receiving a second packet at the node and checking said ID and a bypass flag and determining if the node is in a wrapping state;

if the node is not in said wrapping state, dropping the packet if said ID identifies the node as the originating node and said bypass flag is not set, and forwarding said second packet on the ring if said ID does not identify the node as the originating node or said bypass flag is set;

if the node is in a wrapping state, forwarding said second packet on the ring only if a wrap flag in said second packet is not set.

13. The computer-readable storage medium encoded with computer program instructions of claim 12 further comprising:

receiving notification of a link failure at a node connected to the failed link; and entering a said wrapping state at the node.

14. An apparatus for preventing loops in a ring topology of a computer network, the apparatus comprising:

means for receiving a first packet at an add/drop interface at a node on a shared packet ring;

means for inserting a header containing an ID identifying the node at which the packet was received on the ring as an originating node;

means for forwarding the packet onto the ring;

means for receiving a second packet at the node and checking said ID and a bypass flag;

means for dropping said second packet if said ID identifies the node as the originating node and said bypass flag is not set, and forwarding said second packet on the ring if said ID does not identify the node as the originating node or said bypass flag is set; and means for forwarding said second packet on the ring only if a wrap flag in said second packet is not set, if the node is in a wrapping state.

15. The apparatus of claim 14 further comprising setting said bypass flag in said second packet if the node is in said wrapping state and said wrap flag is not set.

16. The apparatus of claim 14 wherein means for inserting a header further comprises means for inserting a destination node ID.

17. The apparatus of claim 16 wherein the destination node ID is set based on data in a bridging table entry.

18. The apparatus of claim 17 further comprising means for flooding the second packet if the destination node ID matches the node's ID and a matching bridging table entry is not found.

19. The apparatus of claim 14 further comprising means for redirecting the packet at the originating node if a bypass flag is set in the packet.

20. The apparatus of claim 19 further comprising means for reading a node ID table containing an interface direction identifier for the originating node.

* * * * *